United States Patent [19]

Kunze

[11] 4,379,473

[45] Apr. 12, 1983

[54] LONGITUDINALLY DIVIDED CABLE SLEEVE OF A SHRINKABLE MATERIAL

[75] Inventor: Dieter Kunze, Neuried, Fed. Rep. of Germany

[73] Assignee: Siemens Aktiengesellschaft, Berlin & Munich, Fed. Rep. of Germany

[21] Appl. No.: 236,526

[22] Filed: Feb. 20, 1981

[30] Foreign Application Priority Data

Mar. 10, 1980 [DE] Fed. Rep. of Germany ....... 3009078

[51] Int. Cl.³ .................... F16L 11/12; F16L 25/00; F16L 55/16

[52] U.S. Cl. .................... 138/167; 138/103; 138/128; 138/156; 138/178; 174/DIG. 8; 428/913; 138/99

[58] Field of Search ............... 138/103, 99, 128, 156, 138/167, 178; 174/DIG. 8, 92, DIG. 11; 428/36, 99, 913; 24/16 R, 16 PB

[56] References Cited

U.S. PATENT DOCUMENTS

| | | | |
|---|---|---|---|
| 1,185,014 | 5/1916 | Shea | 138/156 X |
| 3,455,336 | 7/1969 | Ellis | |
| 3,542,077 | 11/1970 | Muchmore | 138/178 X |
| 3,991,243 | 11/1976 | Biddell | 138/156 X |
| 4,084,066 | 4/1978 | Gillemot | 138/156 X |
| 4,219,051 | 8/1980 | D'Haeyer | 138/178 |
| 4,241,234 | 12/1980 | Haeder | 174/92 |
| 4,268,559 | 5/1981 | Smuckler | 138/156 X |
| 4,276,909 | 7/1981 | Biscop | 138/156 X |

FOREIGN PATENT DOCUMENTS

| | | |
|---|---|---|
| 2441668 | 3/1976 | Fed. Rep. of Germany . |
| 2832485 | 2/1980 | Fed. Rep. of Germany . |
| 1499592 | 11/1966 | France . |
| 2019123 | 11/1979 | United Kingdom . |

Primary Examiner—James E. Bryant, III
Attorney, Agent, or Firm—Hill, Van Santen, Steadman, Chiara & Simpson

[57] ABSTRACT

A longitudinally divided cable sleeve which is composed of a shrinkable sleeve member of a shrinkable material having a bead on each edge for engagement with a sealing bar to form a sealing system characterized by each of the beads having a non-shrinkable longitudinally extending strengthening element embedded therein and the sealing bar having a pair of side elements interconnected by a central web, said side elements projecting from the central web to form an undercut groove on each side of said web so that the sealing bar is a cross-sectional configuration of a pair of C-shaped profiles facing in opposite directions and each groove receives one bead of the sleeve member to close said cable sleeve. The sealing bar is preferably made of a material having a good heat conduction property to improve the heating of the inner sealing zones during a shrinking process. If desired, a coating of a fusible adhesive can be applied in the area of the sealing zones to increase the sealing effect.

15 Claims, 9 Drawing Figures

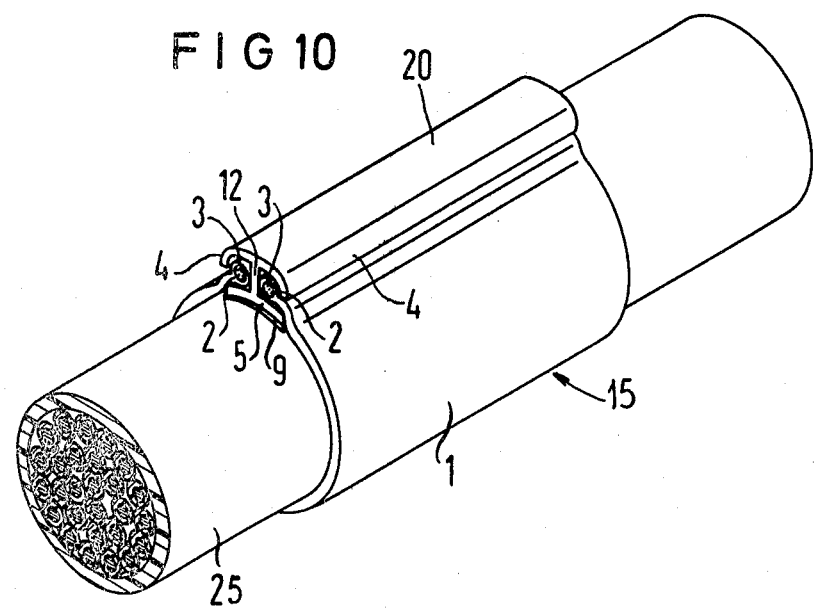
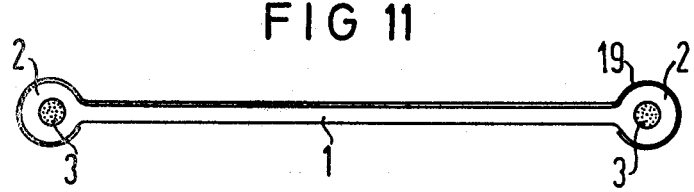

LONGITUDINALLY DIVIDED CABLE SLEEVE OF A SHRINKABLE MATERIAL

BACKGROUND OF THE INVENTION

The present invention is directed to a longitudinally divided cable sleeve, which is composed of a strip-like sleeve member of a shrinkable material, and has a sealing system which is composed of a longitudinal extending bead along each edge of the sleeve member and a sealing bar for engaging the pair of longitudinally extending beads.

A longitudinally divided sleeve casing, which had a sleeve member consisting of thermal plastic synthetic material provided with a shape memory which sleeve member exhibiting a longitudinal divisional or slot, is disclosed in U.S. Pat. No. 3,455,336. Along each of the edges the divided sleeve member has a divided bead which is gripped by a C-shaped clip and is compressed in a sealed fashion.

This type of sealing system has a disadvantage that the beads at the sleeve edges must be undercut to a relatively considerable extent to prevent the bead from slipping out of the anchor provided by the C-shaped sealing bar or clip during the shrinking process. The large amount of undercut can lead to an exaggerating sealing zone, which under certain circumstances can be obstructive. This occurs for example, in particular during repair work to the cable sleeve or in the case of cable sleeves which are to have a slim or small outside diameter.

A further disadvantage of this relatively thick sealing zone consists in the fact that the heat supply in the sealing zone is obstructed and thus under certain circumstances, the sealing agent will be insufficiently activated in a direction extending towards the interior of the cable. Therefore, the use of a fusible adhesive for closing off the sealing system in these zones will lead only to an unsatisfactory result. On the other hand, when the sealing zone is strongly heated, it cannot be entirely ruled out that the bead will become subjected to deformations which lead to the bead slipping out of the clip or sealing bar.

SUMMARY OF THE INVENTION

The present invention is directed to providing a suitable sealing system in a longitudinally divided cable sleeve which is composed of a sleeve member of a shrinkable material and which sealing system ensures both a good heat conduction into a sealing zone for the fusion of a fusible adhesive coating and the shape of stability of the individual sealing element.

To accomplish these goals, the present invention is directed to an improvement in a longitudinally divided cable sleeve having a strip-like sleeve member composed of a shrinkable material and having a sealing system along its edges composed of a longitudinally extending bead on each edge and a sealing bar engaging the beads in a sealed manner. The improvement comprises each of the beads having a non-shrinkable longitudinally extending strengthening element embedded therein and the sealing bar having a pair of side elements interconnected by a central web, said side elements projecting from the central web to form an undercut groove on each side of the web so that a sealing bar has a cross-sectional configuration of a pair of "C" profiles facing in opposite directions and each groove receives one bead of the sleeve member to close said cable sleeve.

In a sealing system of this type, an advantage consists in that the strengthening elements, which do not shrink at the shrinkable temperature, are embedded in those bead arrangements at the edge of the shrinkable sleeve member. This ensures that the shrinking forces, which occur during the shrinking operation, are prevented from leading to a disengagement of the seal. The strengthening members or elements are arranged to extend longitudinally in the bead and their thickness is such that the beads are unable to be disengaged laterally from the C-shaped clip or groove of the sealing bar. The sealing bar will consist of a pair of longitudinally extending C-shaped profiles which are arranged opposite to one another and which possess a common central web. Each of the C-shaped profiles forms an undercut groove which grips only one bead of the sleeve member. This has the advantage that it is only necessary to consider the deformation of one bead which is additionally secured by the strengthening member in accordance with the invention. Furthermore, the opening of the C-shaped profile is constructed in such a manner that the bead and sleeve can be introduced in a longitudinal direction.

In an embodiment, the bead and/or the sealing bar in the sealing zone may be coated with an adhesive and in particular a heat sensitive adhesive which will fuse or melt during the shrinking process and thus ensures a reliable seal. The formation of the sealing bar also contributes to this effect because it preferably consists of a good heat conducting material which does not undergo changes at the shrinking temperature so that due to the extension of the central web into the interior of the sealing zone, an extremely good heat conduction is provided. This ensures that the fusible adhesive is adequately heated until it reaches the fusion state in those parts of the sealing system to which it is normally difficult to gain access.

By an appropriate one sided formation of the beads, and the provision of a plurality of parallel beads of this kind, it is possible to use a single type of sleeve for covering members having different diameters. Should an adaptation be necessary, the sleeve member is merely cut along one of the inner beads to produce a sleeve member having a smaller width for covering a cable or element having a smaller diameter. Thus, it is sufficient to provide a predetermined width for the sleeve member for the largest possible diameter and to cut the sleeve member when using it with smaller diameter elements.

The shape of the sealing bar can also be modified for various ranges of application. For example, the innermost side element can be provided with a circular profile in a direction transverse to the longitudinal axis of the bar so that it will better match the shape of the cable contained within the cable sleeve. To provide a particularly flexibe sealing system, the sealing bar can be provided with transversely extending slots that extend through one of the side elements such as the outer side element and the central web so that the sealing bar will become flexible in a longitudinal direction. Furthermore, the inner walls of the sleeve itself, the beads at the edges in the sealing zone and the sealing bar are expediently provided with the coating of fusible or heat activated adhesive in order to improve upon the sealing properties.

BRIEF DESCRIPTION OF THE DRAWINGS

FIG. 10 is a perspective view of the cable sleeve of FIG. 1 assembled on a cable; and FIG. 11 is an end view of a sealing member of FIG. 2 with an adhesive coating on each bead and on one surface of the member extending therebetween.

DESCRIPTION OF THE PREFERRED EMBODIMENTS

Figure 1:
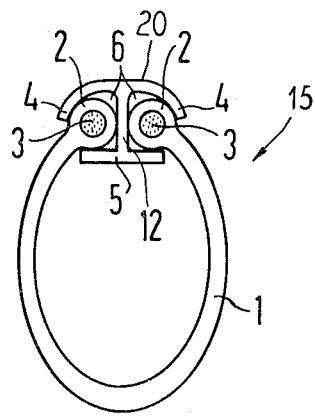
FIG. 1 is an end view of a cable sleeve in accordance with the present invention.

The principles of the present invention are particularly useful in a cable sleeve generally indicated at 15 in FIG. 1 for protecting a connection in a cable 25 (FIG. 10).

The cable sleeve 15 includes a strip like sleeve member 1 which at each end is provided with circular beads 2 and can be considered as a socket tube. In accordance with the present invention, each of the beads 2, which are on the edge of the sleeve member 1 are provided with longitudinally extending strengthening elements which are embedded in the beads 2 and these strengthening elements will not undergo any noticeable change at the temperatures used for shrinking the sleeve member 1 during a shrinking operation. The strengthening elements 3 can consist of rods, flexible wires or cables, or fibers consisting of suitable material such as steel, aluminum, glass or heat resistant synthetic materials. In selecting the shape and also the materials, it is important to ensure that at the shrinkage temperature, no change should occur which would lead to a reduction in the cross-section which reduction would cause a disengagement of the bead from out of the sealing system. The sleeve member 1 is expediently coated on a side facing inward with an adhesive layer 19 which extends over the surfaces of the beads 2 (See FIG. 11) preferably a fusible adhesive, which can be activated at the shrinkage temperature so that a final seal occurs during the shrinking process.

To complete the sealing system, each of the beads 2 of the member 1 are supported in a sealing bar or element 20. The sealing bar 20 has an inner side element 5 and an outer side element 4, which are interconnected by a central web or arm 12 to form two undercut grooves 6 for receiving the beads 2. The two beads 2 are individually supported in individual grooves and not together as in the prior art devices. This has an advantage that the central web 12 of the sealing bar 20 will facilitate an improved heat supply to the underlying sealing zones. Thus, at the shrinking temperatures, the shrinking of the sleeve 1 onto the cable in a peripheral direction will give rise to a shrinkage force which will attempt to pull the softening beads 2 out of the support. This is prevented by virtue of the design of the sealing bar 20 with the undercut grooves 6 in the form of a C-shaped profile and by the presence of the strengthening element or member 3 in each of the beads 2. However, the active shrinking forces deform this softened bead to such an extent that they are impressed into the grooves 6 so as to provide a sealing effect and it is here that the coating of the fusible adhesive material is of a particular advantage. With regard to the formation of the undercut groove 6, it is now important that the side elements 5 and 4 are only contracted towards each other to such an extent that the sleeve 1 adjacent each of the beads 2 can be inserted in the gap between the edges of the side elements but the bead 2 with the embedded strengthening element 3 is unable to be disengaged. In order to be able to grip the two beads 2, the sealing bar 20 has a symmetrical double C-profile and the C-formation are arranged opposite one another and are connected to one another by the common central web 12. The central web 12 has a special function with regard to heat conduction. In fact during the shrinking process, the web 12 serves as a good heat conductor to the inner part of the sealing system. This ensures the fusible adhesive is fully and reliably activated even in the interior zones.

Figure 2:
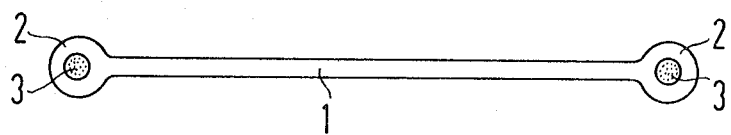
FIG. 2 is an end view of a sealing member used in a cable sleeve of the present invention.

The sleeve member 1 as illustrated in FIG. 2, can be produced in a simple strip form. As illustrated, the longitudinal edges consist of beads 2 with the embedded strengthening element 3. In the embodiment illustrated in FIG. 2, each of the beads 2 has a circular formation and extends from both sides of strip member 1.

Figure 3:
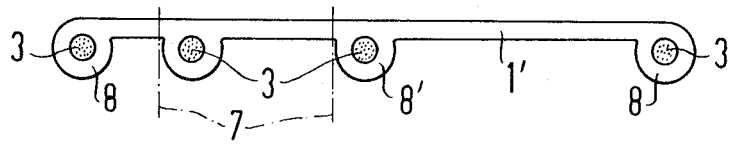
FIG. 3 is an end view of an embodiment of the sleeve member utilized in the cable sleeve of the present invention.

Instead of having beads 2 to extend from both sides of the member 1, the member 1' (FIG. 3) has an edge bead 8 which extends only from one side. In addition, the sleeve 1' has additional beads 8' which extend from one side of the sleeve member 1' between the edge beads 8 and parallel thereto. The sleeve 1' as illustrated in FIG. 3 is first provided with a width for the use with the largest possible diameter. In the event that smaller diameters are desired, the sleeve 1' can be cut to the requisite width along one of the beads such as 8' as indicated by the cutting planes 7. Thus, the sleeve member 1' will have a narrower width and can be used for receiving a smaller diameter cable.

Figure 4:
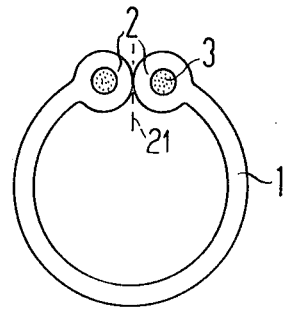
FIG. 4 illustrates an end view of the sleeve member produced by extrusion.

Each of the sleeve members such as 1 of FIG. 2 or 1' of FIG. 3, can be produced by extrusion in the form of a tube as illustrated in FIG. 4 with the embedded strengthening elements 3. Following the extrusion process, the tube with the two beads 2 is separated by a longitudinally extending cut such as in the plane 21.

Figure 5:
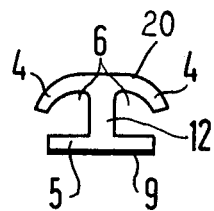
FIG. 5 is an end view of a sealing bar utilized in the present invention.

The sealing bar 20 as best illustrated in FIG. 5 has the side elements 4 bent relative to the side element 5 to form the C-shaped grooves 6 for receiving the beads 2. The underside of the side element 5 is coated with an adhesive coating 9 which is preferably a fusible or heat activated adhesive, which are known. By providing the adhesive, an attachment is established during a shrinking process between the sealing bar 20 and the cable casing of the cable 25 (FIG. 10), a sealing body of the cable sleeve or the like.

Figure 6:
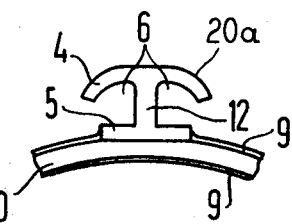
FIG. 6 is an end view of another embodiment of the sealing bar utilized in the present invention.

In FIG. 6, an embodiment of the sealing bar 20a is illustrated. The sealing bar 20a is substantially the same as the sealing bar 20 except that an underside of the side element 5 is provided with a strip of synthetic material 10 which is provided with coatings 9 of a heat activated adhesive to improve the sealing effect. The strip of synthetic material 10 is preferably of the same material that is used to form the sleeve member 1.

Figure 7:
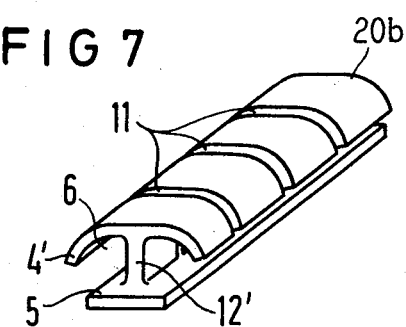
FIG. 7 is a perspective view of a third embodiment of the sealing bar in the present invention.

Another embodiment of the sealing bar 20b is illustrated in FIG. 7 and has a flexible design. Here, the inner side elements 5 is connected by a web 12' to an outer side element 4'. The side element 4' and the central web 12' have been subdivided by transversely extending slots 11 at suitable intervals to improve the flexibility of the bar 20b. As a result, the sealing bar 20b, which now possesses the continuous element 5 can be adapted in to any desired bend or curve.

Figure 8:
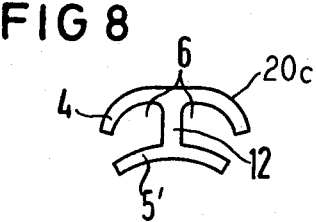
FIG. 8 is an end view of a fourth embodiment of a sealing bar used in the present invention.

Another embodiment of the sealing bar 20c is illustrated in FIG. 8. In this embodiment, the inner side element 5' has a transverse curvature of a circular arc to better match the shape of a cable.

Figure 9:
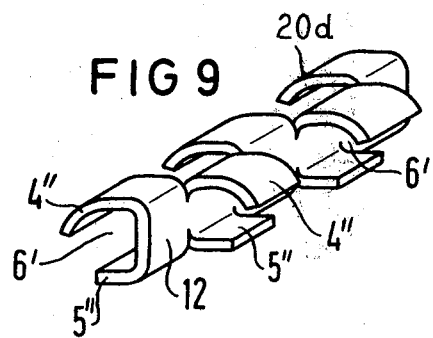
FIG. 9 is a perspective view of a fifth embodiment of the sealing bar of the present invention.

Another embodiment of the sealing bar is the embodiment 20d illustrated in FIG. 9. The sealing bar 20d is produced in a simple manner by utilizing the steps of punching and bending the strips of sheet metal. For this purpose, a strip of sheet metal is provided at suitable intervals from both sides with slots with a gap between the slots corresponding to the height of the groove and the width of the center web 12. After forming the slots, two sections arranged opposite one another are bent towards one side to form a sub-groove 6'. The next two sections are bent in the opposite direction to form a sub-groove 6' extending in the opposite direction. Each of the sub-grooves is formed by part of the bent strip which forms the side edges 4" and 5". These sections are bent alternately in this manner so that the bar 20d has alternately offset sub-grooves 6'. The length of these sub-grooves must be selected to be such that the bead 2 of the sleeve member 1 are introduced and safely held in the fixed position against any shrinkage forces which may operate in a peripheral direction.

Although various minor modifications may be suggested by those versed in the art, it should be understood that I wish to embody within the scope of the patent granted hereon, all such modifications as reasonably and properly come within the scope of my contribution to the art.

I claim:

1. In a longitudinally divided cable sleeve having a strip-like sleeve member composed of a heat shrinkable material having a sealing system along its edge composed of a longitudinal extending bead on each edge and a sealing bar engaging the beads in a sealed manner, the improvements comprising each of the beads having a non-shrinkable longitudinally extending strengthening element embedded therein, and the sealing bar having a pair of side elements interconnected by a central web, said side elements projecting from the central web to form an undercut groove on each side of said web so that the sealing bar has a cross-sectional configuration of a pair of C-shaped profiles facing in opposite directions and each groove receives one bead of the sleeve member to close said cable sleeve.

2. In a longitudinally divided cable sleeve according to claim 1, wherein each of the strengthening elements comprises a rod.

3. In a longitudinally divided cable sleeve according to claim 1, wherein each of the strengthening elements comprises a flexible member.

4. In a longitudinally divided cable sleeve according to claim 1, wherein each of the strengthening elements consists of a synthetic material which does not soften at the shrinking temperature for the material of the sleeve member.

5. In a longitudinally divided cable sleeve according to claim 1, wherein each of the beads projects from both sides of the sleeve member.

6. In a longitudinally divided cable sleeve according to claim 1, wherein each of the beads projecting from only one side of the sleeve member.

7. In a longitudinally divided cable sleeve according to claim 6, which includes at least one additional inner bead extending between the beads on the edge of the sleeve and extending parallel thereto so that by cutting the sleeve member adjacent an inner bead, the width of the sleeve member can be reduced for use with cables of smaller diameters.

8. In a longitudinally divided cable sleeve according to claim 1, wherein the sealing bar consists of a material having a good heat conduction property.

9. In a longitudinally divided cable sleeve according to claim 1, wherein the innermost side element of the sealing bar, in a direction transverse to the longitudinal direction of said bar, has a curvature of a circular arc.

10. In a longitudinally divided cable sleeve according to claim 1, wherein at least the beads of the sealing member are provided with a coating of a fusible adhesive.

11. In a longitudinally divided cable sleeve according to claim 1, wherein the innermost side elements of the sealing bar is provided with a coating of a sealing adhesive extending on a surface extending towards the interior of the cable sleeve.

12. In a longitudinally divided cable sleeve according to claim 1, which includes a strip of material secured to the innermost side element of the sealing bar, said strip of material being coated with an adhesive.

13. In a longitudinally divided cable sleeve according to claim 1, wherein the outermost side element and the central web are subdivided into longitudinal portions by transversely extending slots so that said sealing bar can be bent into a curve.

14. In a longitudinally divided cable sleeve according to claim 1, wherein each of said side elements extending alternately form the central web to form a plurality of sub-grooves on each side of the web for engaging the beads.

15. In a longitudinally divided cable sleeve according to claim 1, wherein each of the strengthening elements has a thickness to prevent lateral disengagement of the bead from the groove of the sealing bar.

* * * * *